Patented Dec. 7, 1926.

1,609,927

UNITED STATES PATENT OFFICE.

JOHANNES WUTKE, OF WOLFEN KREIS BITTERFELD, AND WALTER HAGGE, OF DESSAU IN ANHALT, GERMANY, ASSIGNORS TO I. G. FARBENINDUSTRIE AKTIENGESELLSCHAFT, OF FRANKFORT, GERMANY.

MANUFACTURE OF SULPHUR DYESTUFFS.

No Drawing. Application filed June 8, 1925, Serial No. 35,744, and in Germany June 14, 1924.

It is known that in the manufacture of sulphur dyestuffs an addition of copper to the reaction mixture varies the tone of the color produced. This was first described in the German specification 101,577 which describes the production of a green sulphur dyestuff by the fusion of 4-nitro- or 4-amino-1-hydroxybenzene with sodium hydroxide, sulphur and a copper salt. German specification 102,156 relates to the manufacture of a clear yellow green sulphur dyestuff from the indophenol derived from 1-phenylaminonaphthalene-8-sulphonic acid and 4-amino-1-hydroxybenzene by fusion with a polysulphide with addition of copper, while without copper there is produced a less vivid green blue dyestuff. In the manufacture of violet to brown-red sulphur dyestuffs from azines an addition of copper makes the color tone clearer and more red. (Compare for example the German specifications 171,177 and 179,960).

In all these cases an addition of copper determines the diminution of the black and blue contents of the dyeing, so that the tint is more vivid and therefore of more value.

The copper has hitherto been added to the reaction mixture in various forms, as metallic copper (generally copper bronze) as a soluble salt (generally copper sulphate), as oxide or as sulphide. Since however both metallic copper and copper oxides and the usual copper salts become copper sulphide in the sulphur melt, in all cases the process amounts to a sulphurization in the presence of copper sulphide.

According to the present invention in the manufacture of sulphur dyestuffs with addition of copper the color tone produced is still clearer if the formation of copper sulphide is avoided.

It is possible to avoid the formation of copper sulphide if, for example, there is used in the melt, copper in the form of a complex salt, such as an alkali metal cupro-cyanide, for instance potassium cupro-cyanide $K_6[Cu_2(CN)_8]$, which does not form copper sulphide by reaction with alkali sulphide. Such a melt may be obtained by adding to the melt containing copper in any form, an alkali cyanide so as to convert the copper sulphide produced into complex compounds.

The following examples illustrate the invention without limiting it, the parts being by weight:

1. 25 parts of sulphur are dissolved in 85 parts of crystallized sodium sulphide and there are added at the boiling point 42.6 parts of the leuco-indophenol from 1-phenylaminonaphthalene-8-sulphonic acid and 4-amino-1-hydroxybenzene, having most probably the formula:

together with a solution of potassium cupro-cyanide prepared from 7 parts of copper sulphate crystals and the corresponding proportion of potassium cyanide. The mixture is heated in the reflux apparatus at 110 to 115° C, until the formation of the dyestuff is at an end, whereupon the dyestuff is worked up in the usual manner. It dyes cotton pure yellow green.

2. Into a polysulphide solution made from 110 parts of crystallized sodium sulphide and 50 parts of sulphur are introduced 20 parts of 3-amino-6-hydroxydiphenazine having most probably the formula:

and a solution of potassium cupro-cyanide made from 8 parts of copper sulphate crystals. The whole is boiled at 110° C. for about 30 hours until the formation of the dyestuff is at an end. The dyestuff yields clear yellow-red dyeings.

What we claim is,—

1. The herein-described manufacture of sulphur dyestuffs by conducting the sulphurization in presence of a copper compound, which is not transformable into copper sulphide under the conditions of the reaction.

2. The herein-described manufacture of sulphur dyestuffs by conducting the sulphurization in the presence of a complex copper compound which is not transformable into copper sulphide under the conditions of the reaction.

3. The herein-described manufacture of sulphur dyestuffs by conducting the sulphurization in the presence of alkali metal cuprocyanide.

4. The herein-described manufacture of dyestuffs by sulphurization, which comprises adding an alkali-metal cyanide to a melt comprising the material to be sulphurized, a sulphurizing agent, and copper.

5. Sulphur dyestuffs substantially identical with sulphur dyestuffs obtainable by the herein-described process which consists essentially in conducting the sulphurization in the presence of a copper compound which is not transformable into copper sulphide under the conditions of the reaction; said dyestuffs possessing clearer and redder color tones than dyestuffs produced by sulphurization in the presence of copper compounds transformable into copper sulphide under the conditions of the reaction.

In testimony whereof we affix our signatures.

JOHANNES WUTKE.
WALTER HAGGE.